Patented Sept. 12, 1939

2,172,491

UNITED STATES PATENT OFFICE 2,172,491

COVERING FOR PRINTING ROLLERS

Gustave Auvray, Cachan, France

No Drawing. Application December 1, 1936, Serial No. 113,749. In France December 3, 1935

2 Claims. (Cl. 106—5.5)

This invention relates, on the one hand, to a new composition of material for the manufacture of coverings for printing rollers and similar articles and, on the other hand, to a process for the manufacture of coverings and similar articles from the composition above mentioned.

According to the present invention, the composition above set forth is mainly formed of a mixture composed of an aqueous solution saturated with magnesium chloride, commercial starch and, eventually, colouring matters, which mixture has substantially the following proportions:

100 kilograms of aqueous solution saturated with magnesium chloride;

95 kilograms of commercial starch (preferably wheat starch) having a normal water content of 9% maximum.

The substances above mentioned are thoroughly mixed together and to these substances coloring matters are eventually added; the mixing operation is followed by a sifting operation, thereupon the product is cast in roller moulds or in similar moulds.

The mould is subsequently placed in a drier the temperature of which is progressively increased and maintained between 70° and 100° C., this drying operation being effected during a period of time comprised between two hours and four hours. The product is then removed from the mould and is ready to be used.

According to a modification of the invention, the composition can also be constituted by a mixture formed of:

100 kilograms of aqueous solution saturated with magnesium chloride, 95 kilograms of starch the water content of which has been reduced (by any process whatever) so as to bring it for instance to about 0.5%, and of magnesium chloride, the quantity of this latter body being substantially equal by weight to the quantity of water eliminated in the starch.

To the totality of the mixture above mentioned is added from 2 to 10% of a but slightly drying oil (for instance linseed oil).

The bodies are thoroughly mixed together, the mixture is sifted, cast into moulds, dried and removed from the mould in the manner previously indicated.

Concerning the second composition above mentioned, it is not necessary to reduce the water content of the starch to 0.5 per cent, the quantity of magnesium chloride added being always equal by weight to the quantity of water extracted from the starch.

By way of example, for starch the water content of which has been reduced from 12½ to 3%, the quantity of magnesium chloride added will be about 9%.

It is obvious that the examples of compositions indicated above as well as the example of carrying out the process for the manufacture of coverings are given by way of indication only and not in a limiting sense, as the compositions under consideration and the process can receive any modifications of detail without departing thereby from the scope of the invention.

What I claim as my invention and desire to secure by Letters Patent is:

1. A composition for the manufacture of coverings for printing rollers and the like consisting essentially of an intimate admixture of about 100 parts by weight of saturated aqueous magnesium chloride; 95 parts by weight of commercial wheat starch having a water content of about 0.5% to 9%, said starch having had an original water content of about 13%; magnesium chloride in an amount corresponding to the difference in weight between the first-mentioned water content of the starch and its original water content; and 2 to 10 parts of a slightly drying oil.

2. A composition for the manufacture of coverings for printing rollers and the like consisting essentially of an intimate admixture of about 100 parts by weight of saturated aqueous magnesium chloride; 95 parts by weight of commercial wheat starch having a water content of about 0.5% to 9%, said starch having had an original water content of about 13%; magnesium chloride in an amount corresponding to the difference in weight between the first-mentioned water content of the starch and its original water content; and 2 to 10 parts of linseed oil.

GUSTAVE AUVRAY.